2,999,792
SEROLOGIC TEST

Diego Segre, Madison, Wis., assignor to the United States of America as represented by the Secretary of Health, Education, and Welfare
No Drawing. Filed June 20, 1958, Ser. No. 743,473
1 Claim. (Cl. 167—84.5)

The present invention relates to a novel serologic test and more specifically to an improved test for the detection of viral antigens.

It is often difficult and frequently impossible by examination of a sick animal and the carrying out of routine tests to ascertain the cause of illness. This is particularly true where virus infections are anticipated to be involved or are involved. Where a virus infection is involved the time required for a correct diagnosis under prior procedures often delayed taking appropriate action materially. In view of this, the art has desired a rapid, along with a relatively simple, positive means for the detection (and identification) of viral antigens.

Prior to the present invention, as indicated above, the detection of viral antigens, e.g. for the rapid identification of virus, has posed serious problems. The so-called agglutination test used in the bacterial field, for example, has been found to be unsatisfactory in the virus field. The coating of solid particles such as collodion, bacterial cells, red blood cells, etc. with soluble antigens followed by agglutination by the addition of antibody, also proved unsatisfactory in the virus field primarily because of the time required to obtain and purify the virus antigens required for the coatings along with the difficulties encountered in carrying out these operations. Also, with this procedure the purification of the antigens could not be done in advance but had to be done at the time of the test.

In my research investigations I discovered that the antibody containing gamma globulin fraction, when in aqueous solution with a pH above the isoelectric point of the protein, was attracted to a basic anion exchange resin, and that the gamma globulins including the antibodies when in solutions of this type formed coatings on suspended particles of the anion resin. I also discovered that the finely divided resin and antibodies (gamma globulin fraction) used in the present invention could be prepared in advance and be stored under refrigeration ready for use in testing, and that the coating of the resin particles with the antibody could be rapidly done at the time of the test by merely mixing an aqueous solution of the antibodies with an alkaline buffered suspension of the resin. I further discovered that the coated resin particles formed a stable suspension and that this suspension could be used as such to detect viral antigens in virus-containing material without purification of the antigens. The preparation of the resin and antibodies in advance coupled with the elimination of the purification of the relatively hard to purify antigens, resulted in a material saving of time required to complete a test when the making of a test was indicated.

The improved process of the present invention involves a modification of the procedure described in my prior publication, D. Segre, J. Immunology, 78, 304–309 (1957). It comprises the following basic steps.

(1) *Anion exchange resin.*—The anion exchange resin used in the present invention is in the basic (hydroxide) form (see below) and should be of the strongly basic type. The strongly basic anion (phenolic resin) exchanger available under the trademark Amberlite IRA–400 and made by Rohm & Haas Co. is illustrative of the type of anion exchanger preferred. The anion resin is first finely ground, e.g. in a mortar and pestle. The particle size can vary with fine beads in the general range of about 40 microns being illustrative of a satisfactory size. (As noted below the particles are of the type that form a stable suspension in distilled water.) The ground resin is next suspended in distilled water and allowed to stand for about 30 minutes. The sediment (precipitated resin) is discarded and the supernatant fluid containing the remaining resin in suspension is centrifuged, e.g. for about 5 minutes at 1500 r.p.m. in an international size 1 horizontal centrifuge. The fluid is discarded and the sediment obtained on centrifuging is resuspended in aqueous 1 N NaOH. This suspension is centrifuged as above, and the sediment (resin in the hydroxide form) is resuspended in distilled water and centrifuged. This washing (suspending of the resin in distilled water and centrifuging) is usually repeated for four times to insure the removal of free NaOH or Na ions. (With adequate washing the electrical conductivity of the supernatant fluid approaches that of distilled water.) The final washed resin sediment obtained on centrifuging is next transferred to a petri dish and allowed to dry at about 37° C. The resulting dry, powdery resin is then stored at room temperature until ready for use as described below. The amounts of water and sodium hydroxide (or equivalent alkali metal hydroxide) solution used above can vary but should be adequate to suspend the resin. With the sodium hydroxide solution which can vary in concentration excess over and above that required, e.g. 10 volumes of 1 N NaOH to 1 volume of resin, is preferably employed.

(2) *Antibodies.*—The gamma globulin fractions containing the antibodies are obtained by alcohol fractionation of the serum obtained from animals which have been hyper-immunized to the specific types of virus to be detected or from convalescent serum from animals having recovered from a specific viral disease, by standard means well known in the art. See D. Segre, J. Immunol. supra, and particularly the literature references cited therein. The gamma globulin fractions are lyophilized and stored in a refrigerator until ready for use as described below.

(3) *Virus antigens.*—The virus containing material (or material anticipated to contain virus with resulting antigens) is obtained from the sick animal in the form of blood serum, throat washings, feces, biopses, etc., in accordance with standard practices, at the time of the test. Where the animal is dead and the cause of death is under investigation, e.g. the presence or absence of particular virus are to be determined, the virus-containing materials can also be obtained in accordance with standard procedures from the dead animal's organs such as the spleen and kidney as well as the blood serum, and other sources noted above. See Segre, supra. Purification of the antigen is not required, although some processing, e.g. heating, may be desirable in special cases.

*General test.*—At the time of the test the dry resin is first suspended by shaking in an aqueous medium buffered above the isoelectric point of the gamma globulin (e.g. on the alkaline side above pH 7) and preferably at a pH of about 9.5–10.5. Any of the alkaline buffering materials such as tris (hydroxymethyl) aminomethane, borax, the well-known alkali metal, e.g. sodium, phosphate buffers, etc. can be used. The amount of resin employed can vary although the use of a stable dilute suspension containing about 0.5–2.0 percent resin is preferred. The lyophilized gamma globulin is next added to distilled water with stirring. Here again, the amount of gamma globulin employed can vary although the use of dilute solutions containing about 0.05–0.2 percent gamma globulin are preferred. In any event, the ratio of resin to gamma globulin should be such that when the suspension and solution are mixed (see below)

substantially all of the gamma globulin will be coated on and remain on the resin particles. To provide for this, the use of the resin in slight excess over and above that required to provide a coating surface for the amount of gamma globulin employed is preferred. The optimum amounts for a particular resin and antibody can be readily ascertained by preliminary test. Higher concentrations of resin and gamma globulin over and above the dilute preparations described above can be employed but as they are not required, produce no additional beneficial results and represent a waste of material, their use is contra-indicated. About equal volumes of the dilute resin suspension and dilute gamma globulin solution prepared as above are then mixed together.

Serial, twofold dilutions of the test material (virus containing serum, etc.) are made in distilled water in accordance with standard practices. One drop of each (virus) dilution is placed in separate spots on a glass plate and one drop of the resin-gamma globulin mixture is added to each drop of test material. The two drops are mixed on the plate, e.g. with a wooden applicator, the plate then rotated for a few minutes, and the test read. If there is no agglutination the test is negative. This means that the specific virus is not present in the test material or that it is present in amounts too small to be detected. If there is agglutination (clumping up of material in mixed drops on the plate) the test is positive. This means that the virus present in the test material is the virus under test and corresponds to the virus used to hyper-immunize the animal from which the antibody containing gamma globulin fraction, used in the test, was obtained.

*Specific test.*—The powdered anion exchange resin (Amberlite IRA–400) prepared as described above, was suspended in 0.2 M tris (hydroxymethyl) aminomethane to provide a resin concentration (w./v.) of about one percent. The pH of the resulting suspension was about 10.6. The antibody containing gamma globulin fraction, obtained, as indicated above, by ethanol fractionation of serum from a hog hyper-immunized with hog cholera, was was next diluted and mixed in distilled water to provide a gamma globulin solution with a concentration (w./v.) of about 0.1 percent. Equal volumes (5 ml.) of the resin suspension and gamma globulin solution were then mixed together and shaken.

Serial, twofold dilutions of blood serum obtained from a sick hog were next made in distilled water and a drop of each dilution placed on a glass plate. One drop of the resin-gamma globulin mixture was added to each drop of the test material as described above. The drops were then mixed, the plate rotated and the test read. The presence of clumping (agglutination) of the mixture on the plate disclosed the test to be positive and confirmed the anticipated diagnosis that the sick hog had cholera. If the test had been negative, i.e. if there had been no agglutination, it would have demonstrated that the anticipated diagnosis was incorrect and that either (*a*) the sickness was not caused by virus or (*b*) if caused by virus, then by some virus other than hog cholera. An estimate of the amount of virus present in test material can be inferred from the extent to which the material can be diluted and still cause agglutination.

The improved serologic test of the present invention can be used to detect various virus including vesicular stomatitis virus, type New Jersey, avian laryngo tracheites, rabies, influenza human, avian lymphomatosis, N.Y. virus diarrhea of cattle, an unidentified virus isolated in tissue cultures from cases of mucosal disease (cattle), etc., and, to experts in the art, is obviously susceptible of general application to antigen-antibody systems. In addition to saving time where time is frequently of the essence, its primary advantages lie in its ease of performance and low cost. This also is important in carrying out laboratory tests where time is not of the essence.

I claim:

In an antigen-antibody serologic test for the detection of viral antigens, the improvement which comprises in preparing the antibody for said test as follows: suspending a finely ground anion resin in water, removing any precipitated resin particles, recovering the resin particles remaining in suspension, resuspending the resin particles remaining in suspension in an aqueous sodium hydroxide solution, recovering the resin particles from the sodium hydroxide suspension, washing the resin particles recovered from the sodium hydroxide suspension with water until the electrical conductivity of the wash water approaches that of distilled water, suspending the washed resin particles in water buffered to a pH of about 10.6 with 0.2 M tris (hydroxymethyl) aminomethane to provide a resin concentration w./v. of about 1 percent, diluting a gamma globulin fraction containing a viral antibody with distilled water to provide a gamma globulin concentration w./v. of about 0.1 percent, and then mixing about equal volumes of said buffered resin suspension with said diluted gamma globulin fraction, said mixture containing suspended resin particles coated with antibody and being adaptable for use in said test with inpure antigen in virus-containing material.

References Cited in the file of this patent

UNITED STATES PATENTS 2,669,559     Reid                 Feb. 16, 1954

OTHER REFERENCES

Nature, vol. 181, No. 4, 621, May 24, 1958, pp. 1465–66.
Calmon: Ion Exchangers in Org. and Bio. Chem., Interscience Pub., N.Y., 1957, pp. 284–254 and p. 483.
Boyden: J. Exptl. Med., vol. 93, 1951, pp. 107–120.
Science, pp. 859–863, April 18, 1958.
Segre: J. Immunology, vol. 78, April 1957, pp. 304–9.
Canad. M.A.J., vol. 76, April 15, 1957, pp. 621–623.